United States Patent
Jian et al.

(10) Patent No.: US 12,535,874 B2
(45) Date of Patent: Jan. 27, 2026

(54) METHOD OF MINIMIZING RUSTING AT A POWER INTERFACE OF A WEARABLE COMPUTING DEVICE

(71) Applicant: Google LLC, Mountain View, CA (US)

(72) Inventors: Hao-Yang Jian, New Taipei (TW); Szu-Han Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 29 days.

(21) Appl. No.: 18/663,310

(22) Filed: May 14, 2024

(65) Prior Publication Data

US 2025/0355482 A1  Nov. 20, 2025

(51) Int. Cl.
- *G06F 1/3296* (2019.01)
- *G06F 1/16* (2006.01)
- *G06F 1/3231* (2019.01)

(52) U.S. Cl.
CPC ............ *G06F 1/3296* (2013.01); *G06F 1/163* (2013.01); *G06F 1/3231* (2013.01)

(58) Field of Classification Search
CPC ....... G06F 1/3296; G06F 1/3231; G06F 1/163
See application file for complete search history.

(56) References Cited

U.S. PATENT DOCUMENTS

| | | |
|---|---|---|
| 2016/0048159 A1 | 2/2016 | McCormack et al. |
| 2019/0079037 A1* | 3/2019 | Jol ............ G01R 31/66 |
| 2019/0133464 A1 | 5/2019 | Fish et al. |
| 2022/0344950 A1* | 10/2022 | Chen ........ H02J 7/0042 |

FOREIGN PATENT DOCUMENTS

| | | | |
|---|---|---|---|
| EP | 2898822 | 7/2015 | |
| WO | WO 2016/201366 | 12/2016 | |
| WO | WO 2017/050878 | 3/2017 | |
| WO | WO-2024049434 A1 * | 3/2024 | ............ G04G 19/00 |

OTHER PUBLICATIONS

International Search Report and Written Opinion for Application No. PCT/US2022/042332, mailed Apr. 6, 2023, 11 pages.
Extended European Search Report for Application No. EP 25175834.8, mailed Oct. 6, 2025, 9 pages.

* cited by examiner

*Primary Examiner* — Raymond N Phan
(74) *Attorney, Agent, or Firm* — DORITY & MANNING, P.A.

(57) ABSTRACT

A wearable computing device includes a housing, a band having a circuit, an energy storage device, a power interface configured to deliver electrical power from the energy storage device to the circuit, a switching device configured to selectively couple the energy storage device to the power interface, and a processor. The processor is configured to determine a state of the wearable computing device and initiate a detection window of a certain duration when the state corresponds to a predetermined state and motion of the wearable computing device is detected. More specifically, initiating the detection window includes controlling operation of the switching device to couple the energy storage device to the power interface to deliver the electrical power to the circuit only at intermittent intervals to reduce an amount of the electrical power delivered to the circuit during the certain duration, thereby minimizing rusting at the power interface.

20 Claims, 7 Drawing Sheets

METHOD OF MINIMIZING RUSTING AT A POWER INTERFACE OF A WEARABLE COMPUTING DEVICE

FIELD

The present disclosure relates generally to wearable computing devices. More particularly, the present disclosure relates to devices and methods of minimizing rusting at a power interface between a band and a housing of a wearable computing device.

BACKGROUND

Wearable computing devices can be fastened to the user's wrist via a band that can be removably coupled to a housing of the wearable computing device. In this manner, the band can be an accessory to wearable computing devices. For example, a first band that is coupled to the housing of a wearable computing device can be decoupled from the housing and a second band that is different (e.g., color, material, etc.) than the first band can be coupled to the housing.

The housing also generally contains the main power source of the wearable computing device, and the band contains an integrated circuit (IC). Thus, if the housing wants to communicate with the IC in the band, the power source has to provide power to the IC. However, the power source cannot always provide such power and wait for the user to attach the band as doing so wastes power consumption and it is unknown if the power connection between the IC of the band and the housing contains liquid (e.g., such as via sweat or submersion in water due to swimming, etc.). In the latter case, if liquid is present, rusting can occur to the components at the power interface.

SUMMARY

Aspects and advantages of embodiments of the present disclosure will be set forth in part in the following description, or can be learned from the description, or can be learned through practice of the embodiments.

In an aspect, the present disclosure is directed to a wearable computing device. The wearable computing device includes a housing, a band having a circuit, an energy storage device, a power interface configured to deliver electrical power from the energy storage device to the circuit, a switching device configured to selectively couple the energy storage device to the power interface, and a processor. The processor is configured to determine a state of the wearable computing device and initiate a detection window of a certain duration when the state corresponds to a predetermined state and motion of the wearable computing device is detected. More specifically, initiating the detection window includes controlling operation of the switching device to couple the energy storage device to the power interface to deliver the electrical power to the circuit only at intermittent intervals to reduce an amount of the electrical power delivered to the circuit during the certain duration, thereby minimizing rusting at the power interface.

In another aspect, the present disclosure is directed to a method of minimizing rusting at a power interface between a band and a housing of a wearable computing device. The method includes determining, via a processor of the wearable computing device, a state of the wearable computing device. Further, the method includes initiating, via the processor, a detection window of a certain duration when the state corresponds to a predetermined state and motion of the wearable computing device is detected, wherein initiating the detection window further comprises controlling operation of a switching device of the wearable computing device to couple an energy storage device of the wearable computing device to the power interface to deliver electrical power to a circuit on the band of the wearable computing device only at intermittent intervals to reduce an amount of the electrical power delivered to the circuit during the certain duration, thereby minimizing rusting at the power interface.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
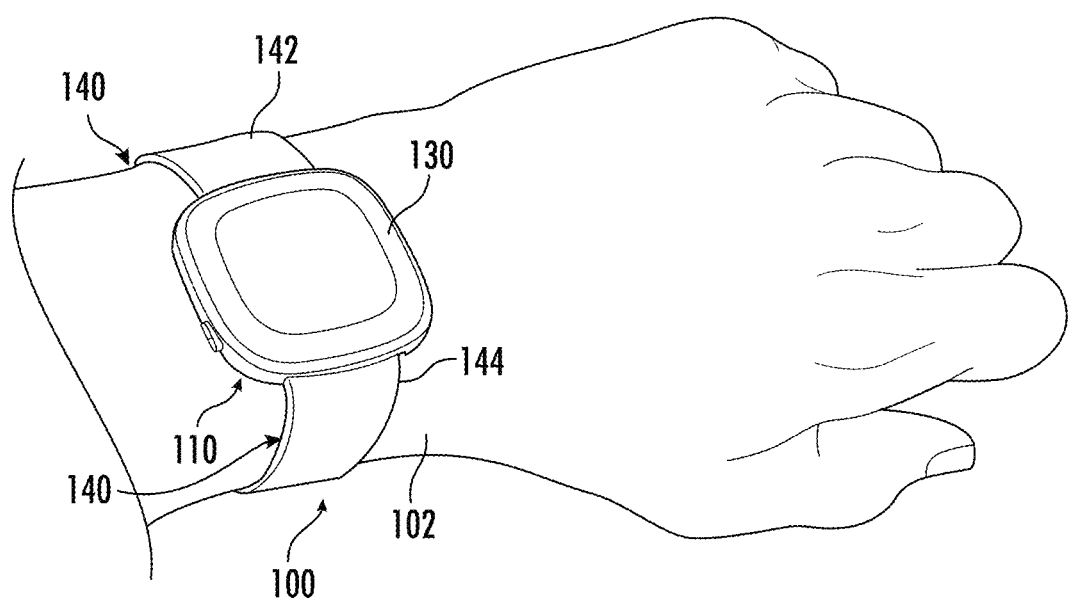
FIG. 1 depicts a wearable computing device worn on an extremity of a user according to some implementations of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present invention covers such modifications and variations as come within the scope of the appended claims and their equivalents.

Figure 2:
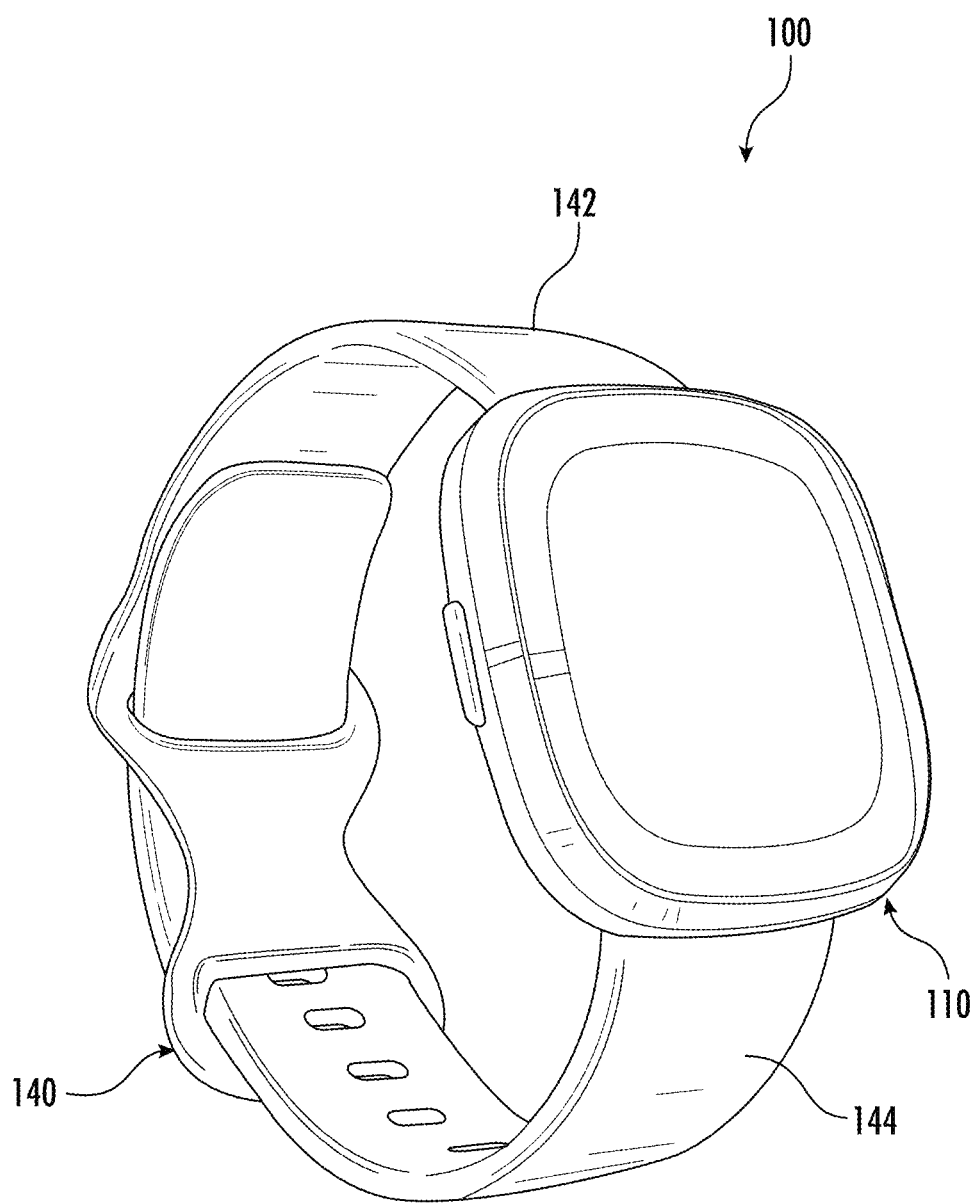
FIG. 2 depicts a perspective view of the wearable computing device of FIG. 1 according to some implementations of the present disclosure.

Referring now to the figures, FIGS. 1 and 2 depict a wearable computing device 100 according to an embodiment of the present disclosure. As shown, the wearable computing device 100 can be worn, for instance, on an arm 102 (e.g., wrist) of a user. The wearable computing device 100 can include a housing 110 defining a cavity in which one or more electronic components (e.g., disposed on printed circuit boards) are disposed. For instance, the wearable computing device 100 can include a printed circuit board (e.g., flexible printed circuit board) disposed within the cavity. Furthermore, one or more electronic components can be included on the printed circuit board. The wearable computing device 100 can further include a battery (not shown) that is disposed within the cavity defined by the housing 110.

In some embodiments, the wearable computing device 100 includes a display 130. The display 130 can display content (e.g., date, time, step count, heart rate, etc. etc.) for viewing by the user. It should be understood that the display 130 can include any suitable type of display. For instance, in some embodiments, the display 130 can be an organic light emitting diode (OLED) display. It should be understood that the display 130 can be positioned underneath a display cover. In this manner, the display 130 can be protected from being damaged (e.g., scratched, cracked). It should also be understood that the display cover can be transparent. In this manner, the user can view the display 130 through the display cover.

As shown, the wearable computing device 100 can be secured to the arm 102 (e.g., wrist) of the user via a band 140. The band 140 can include a first portion 142 and a second portion 144 that is separate from the first portion 142. The first portion 142 of the band 140 can be removably coupled to the housing 110 at a first location thereon. Conversely, the second portion 144 of the band 140 can be removably coupled to the housing 110 at a second location thereon that is different from the first location. For instance, the first location and the second location can be on opposing sides of the housing 110.

It should be understood that the first portion 142 of the band 140 can be coupled to the second portion 144 of the band 140 to fasten the wearable computing device 100 to the arm 102 of the user. In some embodiments, the first portion 142 of the band 140 can include a buckle or clasp (not shown). Additionally, the second portion 144 of the band 140 can include a plurality of apertures (not shown) spaced apart from one another along a length of the second portion 144 of the band 140. In such embodiments, a prong of the buckle associated with the first portion 142 of the band 140 can extend through one of the plurality of openings defined by the second portion 144 of the band 140 to couple the first portion 142 of the band 140 to the second portion 144 of the band 140.

It should be appreciated that the first portion 142 of the band 140 can be coupled to the second portion 144 of the band 140 using any suitable type of fastener. For instance, in some embodiments, the first portion 142 of the band 140 and the second portion 144 of the band 140 can include a magnet. In such embodiments, the first portion 142 of the band 140 and the second portion 144 of the band 140 can be magnetically coupled to one another to fasten the wearable computing device 100 to the arm 102 of the user. It should also be appreciated that the band 140 can be swapped for different bands. For instance, the band 140 can be of a first type (e.g., color, material) and can be swapped out for a band of a second type that is different than the first type. In this manner, the band 140 can be an accessory to the wearable computing device 100 that can be customized according to the user's preferences.

Figure 3:
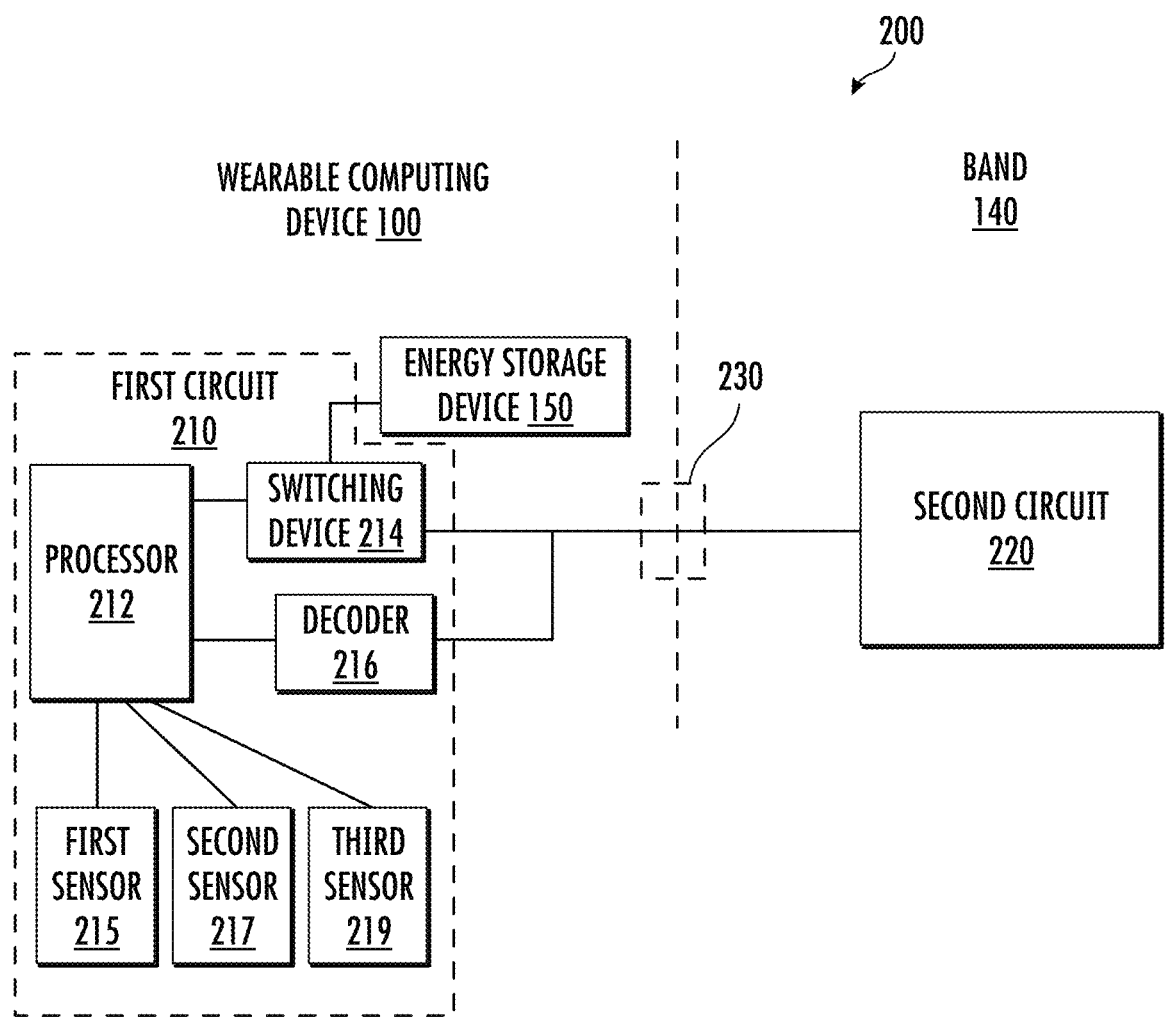
FIG. 3 depicts a block diagram of components of a system of a wearable computing device according to some embodiments of the present disclosure.
Figure 4:
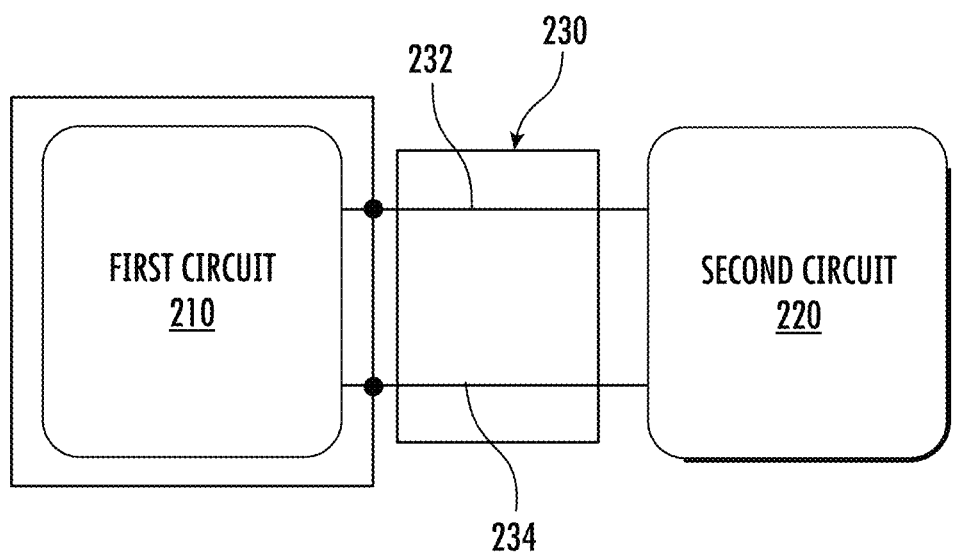
FIG. 4 depicts a power interface of a system of a wearable computing device according to some embodiments of the present disclosure.

Referring now to FIGS. 3 and 4, a system 200 for controlling the wearable computing device 100 is provided according to an embodiment of the present disclosure. As shown, the system 200 can be distributed across both the wearable computing device 100 and the band 140. More particularly, the system 200 can include a first circuit 210 that is onboard (e.g., part of) the wearable computing device 100 and a second circuit 220 that is onboard (e.g., part of) the band 140. In some embodiments, the second circuit 220 can be included on the first portion 142 (FIG. 2) of the band 140 or the second portion 144 (FIG. 2) of the band 140. In alternative embodiments, the second circuit 220 can be included on both the first portion 142 of the band 140 and the second portion 144 of the band 140. For instance, in some embodiments, a first instance of the second circuit 220 can be included on the first portion 142 of the band 140 and a second instance of the second circuit 220 can be included on the second portion 144 of the band 140.

The system 200 can include a power interface 230 configured to deliver electrical power from an energy storage device 150 (e.g., battery, capacitor, etc.) on the wearable computing device 100 to the second circuit 220 included on the band 140. In some embodiments, as shown particularly in FIG. 4, the power interface 230 can include a first conductor 232 (e.g., wire) for delivering power from the energy storage device 150 (FIG. 3) of the wearable computing device 100 to the second circuit 220 included on the band 140. Further, as shown in FIG. 4, the power interface 230 can further include a second conductor 234 that is electrically grounded. It should be understood that the power interface 230 can be implemented on both the wearable computing device 100 and the band 140 as electrical contacts. For instance, the first conductor 232 of the power interface 230 can be implemented as a first electrical contact on the wearable computing device 100 and the band 140. Additionally, the second conductor 234 can be implemented as a second electrical contact on the wearable computing device 100 and the band 140. It should be understood that the electrical contacts on the band 140 contact the respective contacts on the wearable computing device 100 when the band 140 is removably coupled to the housing 110 (FIG. 2) of the wearable computing device 100.

In some embodiments, as shown in FIG. 3, the first circuit 210 can include a processor 212 and a switching device 214. The switching device 214 can be electrically coupled between the energy storage device 150 and the power interface 230. Furthermore, the processor 212 can be communicatively coupled to the switching device 214. In this manner, the processor 212 can communicate one or more control signals associated with controlling operation of the switching device 214. For instance, the processor 212 can control operation of the switching device 214 to couple the energy storage device 150 to power interface 230 so that electrical power can be transferred from the energy storage device 150 to the second circuit 220 included on the band 140. Conversely, the processor 212 can control operation of the switching device 214 to decouple the energy storage device 150 from the power interface 230 so that electrical power cannot be transferred from the energy storage device 150 to the second circuit 220 included on the band 140.

In some embodiments, the processor 212 can control operation of the switching device 214 based, at least in part, on data obtained from one or more sensors of the wearable computing device 100. For instance, in some embodiments, the processor 212 can control operation of the switching device 214 to couple the energy storage device 150 to the power interface 230 in response to determining the wearable computing device 100 is being worn by the user. In this manner, electrical power can be transferred from the energy storage device 150 to the second circuit 220 included on the band 140 when the wearable computing device 100 is being worn by the user.

In some embodiments, the processor 212 can control operation of the switching device 214 to couple the energy storage device 150 to the power interface in response to determining the wearable computing device 100 is not being worn by the user. In this manner, electrical power can be transferred from the energy storage device 150 to the second circuit 220 included on the band 140 when the wearable computing device 100 is not being worn by the user.

It should be understood, however, that any suitable sensor, as well as any number of sensors, which is configured to obtain data indicative of whether the user is wearing the wearable computing device 100 is within the scope of the present disclosure. For instance, in some embodiments, as shown in FIG. 3, the sensor(s) can include a first sensor 215, a second sensor 217, and a third sensor 219. In such embodiments, the first sensor 215 may be configured to generate a first signal indicative of the state of the wearable computing device 100, whereas the second sensor 217 may be a motion sensor (e.g., accelerometer, inertial measurement unit, etc.). In still further embodiments, the third sensor 219 may be a light sensor as further described herein below.

The second circuit 220 can be configured to communicate with the first circuit 210 via one or more signals containing any suitable information for the band 140. In some embodiments, the band 140 can also include sensors that are not included on the wearable computing device 100. In such embodiments, the band 140 can be attached to the housing 110 of the wearable computing device 100 to provide additional functionality (e.g., sensing capability).

In some embodiments, the second circuit 220 can be configured to modulate the signal to generate a modulated signal that is communicated to the wearable computing device 100. For instance, in some embodiments, the second circuit 220 can communicate the modulated signal to the first circuit 210 via the power interface 230. In alternative embodiments, the second circuit 220 can communicate the modulated signal to the first circuit 210 via a wireless network. It should be understood that the second circuit 220 can be configured to implement any suitable modulation scheme. For instance, in some embodiments, the second circuit 220 can be configured to modulate the signal according to an on-off keying modulation scheme.

In some embodiments, the first circuit 210 can include a decoder 216 configured to decode the modulated signal received from the second circuit 220. For instance, the decoder 216 can decode the modulated signal to obtain the unique identifier for the band 140. Furthermore, the decoder 216 can communicate the unique identifier to the processor 212.

Figure 5:
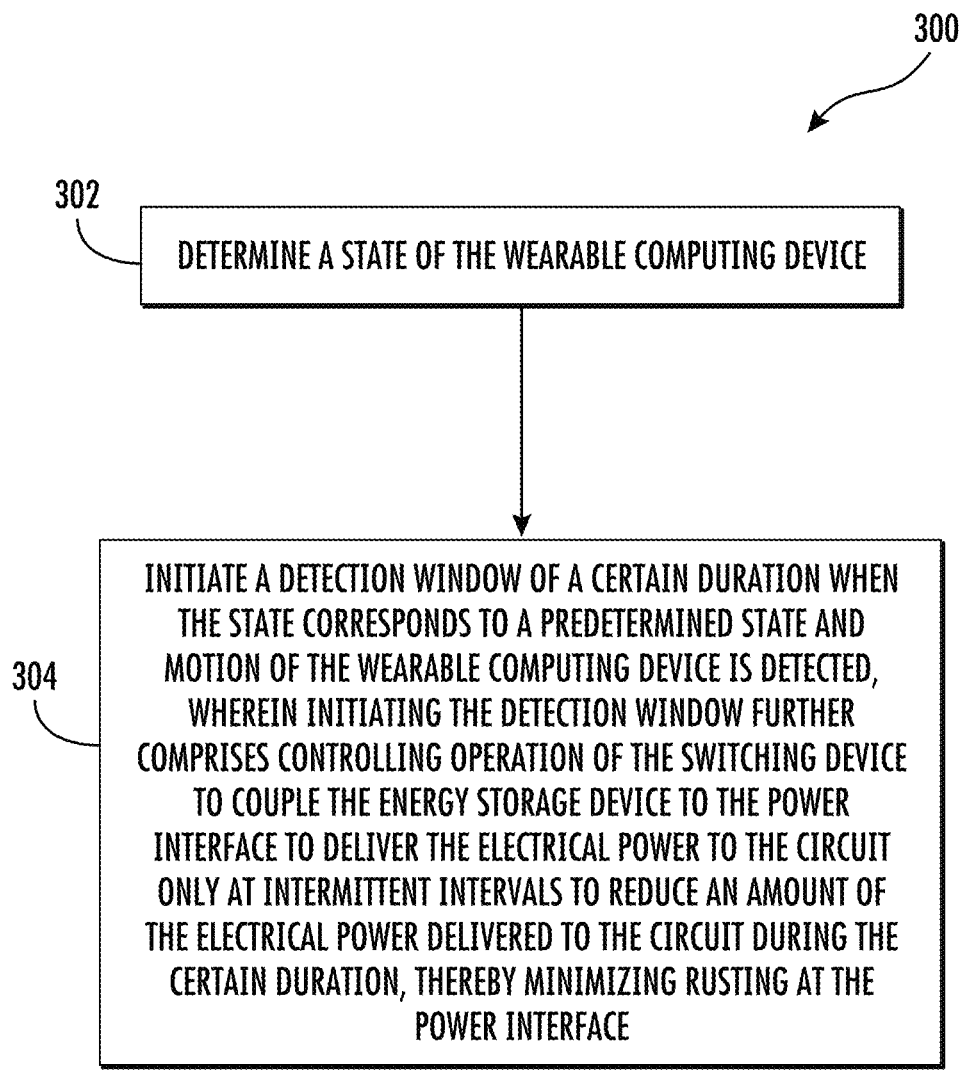
FIG. 5 depicts a method of minimizing rusting at a power interface between a band and a housing of a wearable computing device according to some embodiments of the present disclosure.

Referring now to FIG. 5, a flow diagram of an example method 300 of minimizing rusting at a power interface between a band and a housing of a wearable computing device is provided according to an embodiment of the present disclosure. The method 300 can be implemented by, for instance, the wearable computing device 100 and the system 200 discussed above with reference to FIGS. 1-4. FIG. 5 depicts steps performed in a particular order for purposes of illustration and discussion. Those of ordinary skill in the art, using the disclosures provided herein, will understand that various steps of the method 300 or any of the other methods disclosed herein may be adapted, modified, rearranged, performed simultaneously, or modified in many ways without deviating from the scope of the present disclosure.

As shown at (302), the method 300 includes determining, via a processor of the wearable computing device, a state of the wearable computing device. As shown at (304), the method 300 includes initiating, via the processor, a detection window of a certain duration when the state corresponds to a predetermined state and motion of the wearable computing device is detected. For example, in an embodiment, the predetermined state may correspond to the housing 110 being off-wrist and the band 140 being attached to the housing 110.

Furthermore, in particular embodiments, and still referring to (304), initiating the detection window may include controlling operation of the switching device 214 to couple the energy storage device 150 to the power interface 230 to deliver electrical power to the circuit (i.e., the second circuit 220) on the band 140 only at intermittent intervals to reduce an amount of the electrical power delivered to the circuit during the certain duration, thereby minimizing rusting at the power interface 230.

For example, in an embodiment, the method 300 may include receiving a first signal from the first sensor 215 indicative of the state of the wearable computing device 100. In such embodiments, when the first signal indicates the wearable computing device 100 corresponds to the predetermined state, the method 300 may further include receiving a motion signal from the second sensor 217. In such embodiments, the motion signal is configured to indicate a presence or absence of an instant motion event of the wearable computing device 100. As such, the instant motion event represents the user attempting to attach or detach the band 140 from the housing 110.

Accordingly, in an embodiment, the method 300 may include initiating the detection window of the certain duration upon receipt of the motion signal indicating the presence of the instant motion event.

In another embodiment, the method 300 may include ceasing delivery of the electrical power to the circuit at an end of the detection window so as to minimize rusting at the power interface 230. In further embodiments, the method 300 may include extending the detection window upon receipt of one or more additional instant motion events during the detection window.

In further embodiments, the method 300 may include splitting the detection window into a plurality of detection windows of the certain duration.

Moreover, in an embodiment, the method 300 may include initiating a hibernation state of the wearable computing device 100 based at least in part on data received from the light sensor (e.g., third sensor 219). In such embodiments, the method 300 may include overriding the detection window for the certain window to initiate the hibernation state when a plurality of consecutive instant motion events continue to occur for an extended duration and until the light sensor indicates a change in brightness of the wearable computing device 100.

Generally, the trigger point of the detection window is from the motion sensor. Thus, in an embodiment, in the hibernation state, the processor 212 is configured to stop receiving motion events from the motion sensor. As such, in the hibernation state, the processor 212 does not initiate any detection windows, but is still running. Further, in an embodiment, the processor 212 is configured to exit the hibernation state (and thus begin receiving motion events again) when any of following conditions occurs: the display turns on, caused by e.g., a user pressing the power button, a user touching the display to wake up the display, a user holding the wearable computing device 100 at a specific angle (e.g., tilting to wake), and/or an alarm or incoming call turns on the display. Furthermore, in an embodiment, the light sensor may report a brightness value (such as equal to or greater than 30) and the last lux before entering the hibernation state must be dark (such as equal to or less than 5). In other words, if the processor 212 enters the hibernation state during a bright environment, the processor 212 will not exit the hibernation state by receiving a high lux value. In further embodiments, a necessary condition to enter the hibernation state may be that the processor 212 receives a certain sufficient number of motion events (X) in recent seconds (Y). For example, in an embodiment, in a dark environment (such as equal to or less than 5), X=15, Y=30. In such embodiments, if the wearable computing device 100 wobbles for 15 seconds in the most recent 30 seconds, then the wearable computing device 100 will enter the hibernation state. In a bright environment (such as equal to or greater than 30), X=30 and Y=60. If the wearable computing device 100 is idle in a dark environment, the processor 212 will not enter the hibernation state.

Figure 6:
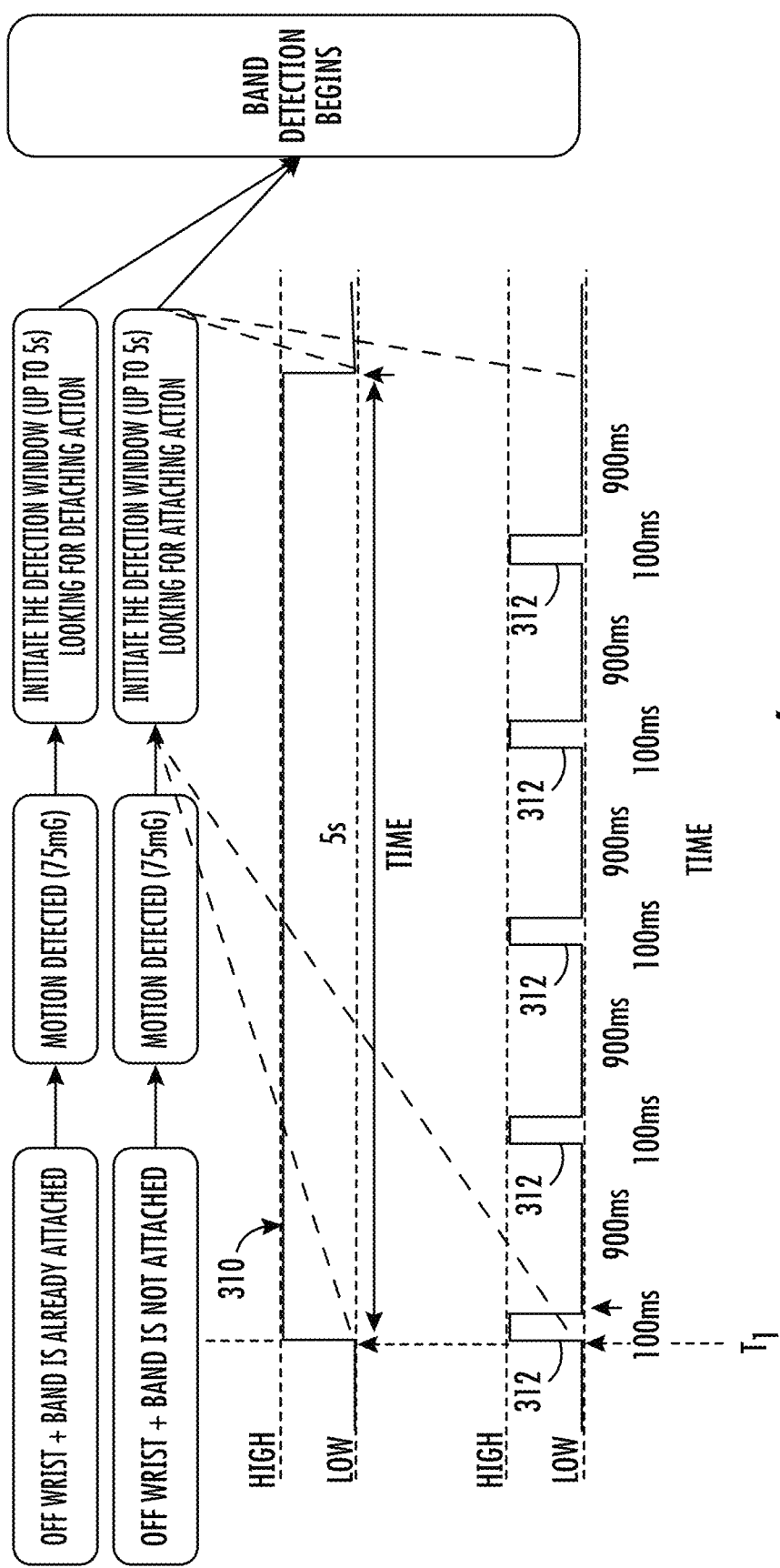
FIG. 6 depicts a flow diagram and graph providing details of a method for minimizing rusting at a power interface between a band and a housing of a wearable computing device according to some embodiments of the present disclosure.

The method 300 of FIG. 5 can be better understood with respect to FIG. 6. In particular, as shown, FIG. 6 depicts a flow diagram and graph providing details of the method 300 for minimizing rusting at the power interface 230 according to some embodiments of the present disclosure.

In particular, as shown, one or more sensors (such as the first sensor 215, which may be a low latency off body (LLOB) sensor), may be used to trigger a detection window 310. Thus, in an embodiment, the first sensor 215 is configured to report an on/off wrist event, such that processor 212 can detect the band 140 during an off-wrist state. Accordingly, as shown at $T_1$, the processor 212 is configured to initiate the detection window 310 of a certain duration (such as 5 seconds) when the state corresponds to a predetermined state (e.g., off-wrist and the band 140 is attached to the housing 110) and motion of the wearable computing device 100 is detected. For example, in addition to the first sensor 215, the second sensor 217 may also be used to detect an instant motion, which can communicate with the processor 212 that an instant motion event (e.g., 75 mG) has occurred. In such embodiments, the instant motion event may be caused when a user attempts to attach or detach the band 140 to the housing 110. Once the processor 212 receives an instant motion event, the processor 212 is configured to initiate the detection window 310 for X seconds. Once the band is attached during this detection window 310, the band 140 can be detected immediately.

Further, in such embodiments, initiating the detection window 310 may include controlling operation of the switching device 214 to couple the energy storage device 150 to the power interface 230 to deliver the electrical power to the circuit only at intermittent intervals 312 (such as 100 milliseconds (ms) intervals) to reduce an amount of the electrical power delivered to the circuit during the certain duration, thereby minimizing rusting at the power interface 230. More specifically, as shown, a duty cycle of approximately 10% is illustrated for the intermittent intervals 312, which also represents a power reduction during the detection window 310 of about 10%. At the end of detection window 310, the power turns off to further prevent rusting. A new instant motion event received in the detection window 310 can further extend the window to X seconds later.

Figure 7:
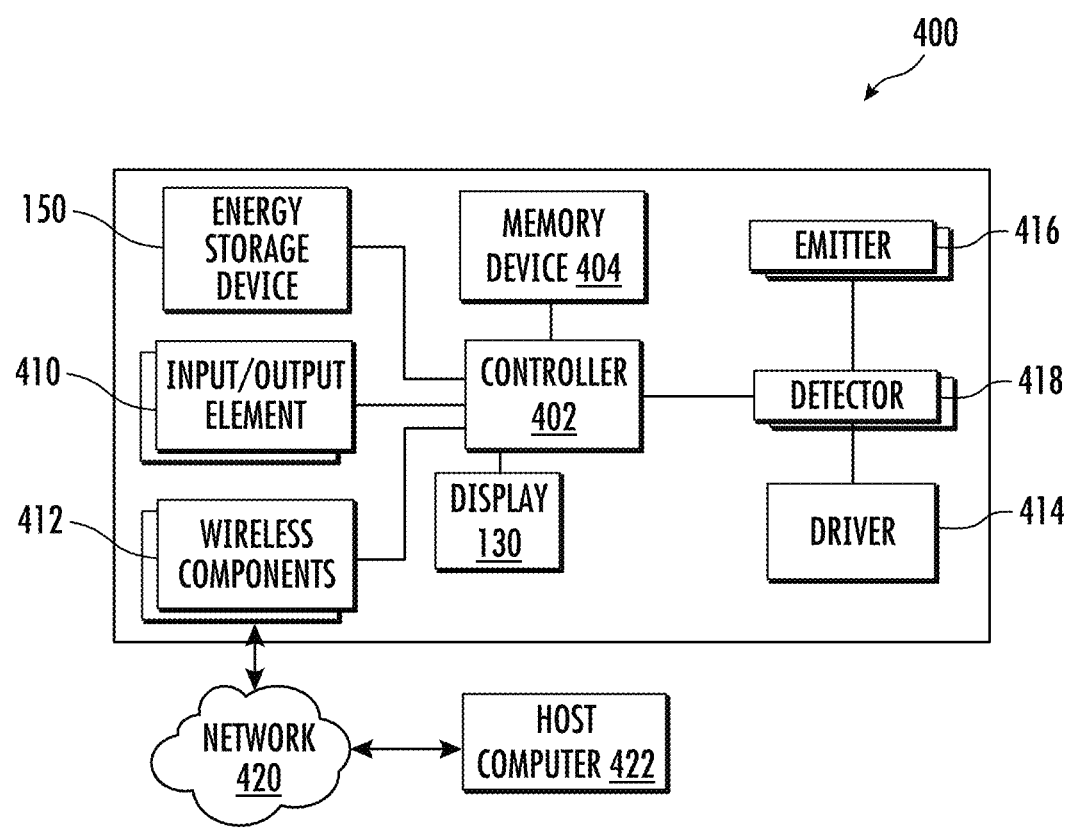
FIG. 7 depicts components of an example computing system of a wearable computing device according to some embodiments of the present disclosure.

Referring now to FIG. 7, components of an example computing system 400 of the wearable computing device 100 that can be utilized in accordance with various embodiments are illustrated. In particular, as shown, the computing system 400 may also include at least one controller 402. Moreover, in an embodiment, the controller(s) 402 can be a central processing unit (CPU) or graphics processing unit (GPU) for executing instructions that can be stored in a memory device 404, such as flash memory or DRAM, among other such options. For example, in an embodiment, the memory device 404 may include RAM, ROM, FLASH memory, or other non-transitory digital data storage, and may include a control program comprising sequences of instructions which, when loaded from the memory device 404 and executed using the controller(s) 402, cause the controller(s) 402 to perform the functions that are described herein.

The computing system 400 can include many types of memory, data storage, or computer-readable media, such as data storage for program instructions for execution by the controller or any suitable processor. The same or separate storage can be used for images or data, a removable memory can be available for sharing information with other devices, and any number of communication approaches can be available for sharing with other devices. In addition, as shown, the computing system 400 includes the display 130, which may be a touch screen, organic light emitting diode (OLED), or liquid crystal display (LCD), although devices might convey information via other means, such as through audio speakers, projectors, or casting the display or streaming data to another device, such as a mobile phone, wherein an application on the mobile phone displays the data.

The computing system 400 also includes the energy storage device 150, which is operable to be recharged through conventional plug-in approaches. In some embodiments, the computing system 400 can also include at least one additional I/O device 410 able to receive conventional input from a user. This conventional input can include, for example, a push button, touch pad, touch screen, wheel, joystick, keyboard, mouse, keypad, or any other such device or element whereby a user can input a command to the computing system 400. In some embodiments, the I/O device(s) 410 can be connected by a wireless infrared or Bluetooth or other link as well in some embodiments. In some embodiments, the computing system 400 can include a microphone or other audio capture element that accepts voice or other audio commands. In some embodiments, the I/O device(s) 410 can include one or more electrodes, optical sensors, barometric sensors (e.g., altimeter, etc.), and the like.

The computing system 400 can include one or more wireless networking components 412 operable to communicate with one or more electronic devices within a communication range of a particular wireless channel. The wireless channel can be any appropriate channel used to enable devices to communicate wirelessly, such as Bluetooth, cellular, NFC, Ultra-Wideband (UWB), or Wi-Fi channels. It should be understood that the computing system 400 can have one or more conventional wired communications connections as known in the art.

The computing system 400 can include a driver 414 and at least some combination of one or more emitters 416 and one or more detectors 418 for measuring data for one or more metrics of a human body, such as for a person wearing the wearable computing device 100. In some embodiments, for example, this may involve at least one imaging element, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Further image capture elements may also include depth sensors. Methods for capturing images using a camera element with a computing device are well known in the art and will not be discussed herein in detail. It should be understood that image capture can be performed using a single image, multiple images, periodic imaging, continuous image capturing, image streaming, etc. Further, the computing system 400 can include the ability to start and/or stop image capture, such as when receiving a command from a user, application, or other device.

Moreover, in an embodiment, the emitters 416 and detectors 418 may be coupled to the controller 402 directly or indirectly using driver circuitry by which the controller 402 may drive the emitters 416 and obtain signals from the detectors 418. The host computer 422 can communicate with the wireless networking components 412 via the one or more networks 420, which may include one or more local area networks, wide area networks, UWB, and/or internetworks using any of terrestrial or satellite links. In some embodiments, the host computer 422 executes control programs and/or application.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A wearable computing device, comprising:
   a housing;
   a band comprising a circuit;
   an energy storage device;
   a power interface configured to deliver electrical power from the energy storage device to the circuit;
   a switching device configured to selectively couple the energy storage device to the power interface; and
   a processor configured to:
      determine a state of the wearable computing device; and
      initiate a detection window of a certain duration when the state corresponds to a predetermined state and motion of the wearable computing device is detected,
      wherein initiating the detection window further comprises controlling operation of the switching device to couple the energy storage device to the power interface to deliver the electrical power to the circuit only at intermittent intervals to reduce an amount of the electrical power delivered to the circuit during the certain duration, thereby minimizing rusting at the power interface.

2. The wearable computing device of claim 1, wherein the predetermined state corresponds to the housing being off-wrist and the band being attached to the housing.

3. The wearable computing device of claim 1, wherein the processor is further configured to split the detection window into a plurality of detection windows of the certain duration.

4. The wearable computing device of claim 1, wherein the power interface includes a first conductor for power and a second conductor for electrical ground.

5. The wearable computing device of claim 2, further comprising one or more sensors, wherein the one or more sensors comprises, at least, a first sensor and a second sensor.

6. The wearable computing device of claim 5, wherein the processor is further configured to receive a first signal from the first sensor indicative of the state of the wearable computing device.

7. The wearable computing device of claim 5, wherein the one or more sensors further comprise a light sensor, and wherein the circuit of the band is configured to initiate a hibernation state of the wearable computing device based at least in part on data received from the light sensor.

8. The wearable computing device of claim 6, wherein, when the first signal indicates the wearable computing device corresponds to the predetermined state, the processor is further configured to receive a motion signal from the second sensor, the motion signal configured to indicate a presence or absence of an instant motion event of the wearable computing device, the instant motion event representing a user of the wearable computing device attempting to attach or detach the band from the housing.

9. The wearable computing device of claim 7, wherein the circuit of the band is further configured override the detection window for the certain window to initiate the hibernation state when a plurality of consecutive instant motion events continue to occur for an extended duration and when any one or more of following conditions occurs: the light sensor indicates a change in brightness of the wearable computing device, a display of the wearable computing device turns on, a user holding the wearable computing device at a specific angle, or an alarm or incoming call turns on the display.

10. The wearable computing device of claim 8, wherein the processor initiates the detection window of the certain duration when the processor receives the motion signal indicating the presence of the instant motion event.

11. The wearable computing device of claim 10, wherein the processor is further configured to cease delivery of the electrical power to the circuit at an end of the detection window so as to minimize rusting at the power interface.

12. The wearable computing device of claim 11, wherein the processor is further configured to extend the detection window upon receipt of one or more additional instant motion events during the detection window.

13. A method of minimizing rusting at a power interface between a band and a housing of a wearable computing device, the method comprising:
   determining, via a processor of the wearable computing device, a state of the wearable computing device; and
   initiating, via the processor, a detection window of a certain duration when the state corresponds to a predetermined state and motion of the wearable computing device is detected,
   wherein initiating the detection window further comprises controlling operation of a switching device of the wearable computing device to couple an energy storage device of the wearable computing device to the power interface to deliver electrical power to a circuit on the band of the wearable computing device only at intermittent intervals to reduce an amount of the electrical power delivered to the circuit during the certain duration, thereby minimizing rusting at the power interface.

14. The method of claim 13, wherein the predetermined state corresponds to the housing being off-wrist and the band being attached to the housing.

15. The method of claim 14, further comprising receiving a first signal from a first sensor indicative of the state of the wearable computing device.

16. The method of claim 14, further comprising ceasing delivery of the electrical power to the circuit at an end of the detection window so as to minimize rusting at the power interface.

17. The method of claim 14, further comprising extending the detection window upon receipt of one or more additional instant motion events during the detection window.

18. The method of claim 14, further comprising initiating a hibernation state of the wearable computing device based at least in part on data received from a light sensor and when a plurality of consecutive instant motion events continue to occur for an extended duration and when any one or more of following conditions occurs: the light sensor indicates a change in brightness of the wearable computing device, a display of the wearable computing device turns on, a user holding the wearable computing device at a specific angle, or an alarm or incoming call turns on the display.

19. The method of claim 15, wherein, when the first signal indicates the wearable computing device corresponds to the predetermined state, the method further comprises receiving a motion signal from a second sensor, the motion signal configured to indicate a presence or absence of an instant motion event of the wearable computing device, the instant motion event representing a user of the wearable computing device attempting to attach or detach the band from the housing.

20. The method of claim 19, further comprising initiating the detection window of the certain duration when the processor receives the motion signal indicating the presence of the instant motion event.

* * * * *